Patented Sept. 14, 1943

2,329,514

UNITED STATES PATENT OFFICE 2,329,514

PREPARATION OF PENTAERYTHRITOL

Richard F. B. Cox, Wilmington, Del., assignor to Hercules Powder Company, Wilmington, Del., a corporation of Delaware No Drawing. Application June 29, 1940, Serial No. 343,176

14 Claims. (Cl. 260—635)

This invention relates to an improved process for the preparation of pentaerythritol, and more particularly to such a process wherein the preparation is greatly facilitated.

Pentaerythritol has heretofore been prepared by reacting formaldehyde with acetaldehyde in the presence of water and an alkali such as calcium hydroxide, sodium hydroxide, or the like. Prior processes for the production of pentaerythritol have been disadvantageous in numerous respects among which is the occurrence of side reactions to form sugar-like syrups which greatly reduced the yield of pentaerythritol obtained.

It is an object of the present invention to provide an improved process for the preparation of pentaerythritol.

Another object is to materially improve the yield of pentaerythritol.

Another object is to catalyze the production of pentaerythritol from acetaldehyde and formaldehyde in such manner as to greatly reduce the side reactions and correspondingly improve the resulting yield.

Another object is to provide for a more effective preparation of pentaerythritol.

Still other objects will more fully hereinafter apear.

Pentaerythritol may be considered to be formed from acetaldehyde and formaldehyde in the presence of an alkali in accordance with the following reactions. The first stage appears to be an aldol condensation brought about by the presence of fixed alkali and taking place as follows:

(I)  3CH₂O+CH₃CHO→(HOCH₂)₃C—CHO

In accordance with this reaction pentaerythrose is assumed to be formed. The next stage in the reaction may be considered to involve the reaction of the pentaerythrose with additional formaldehyde whereby the pentaerythrose is reduced to pentaerythritol and the additional formaldehyde taking part in the reaction is oxidized to formic acid, which immediately combines with the alkali present to form an alkali formate, in accordance with the following equation:

(II) 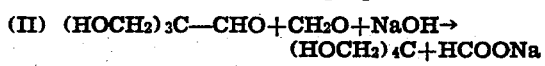 (HOCH₂)₃C—CHO+CH₂O+NaOH→
(HOCH₂)₄C+HCOONa where sodium hydroxide is the alkali present.

I have discovered that the production of pentaerythritol from acetaldehyde and formaldehyde may be greatly expedited by reacting the formaldehyde with the acetaldehyde in the presence of a Cannizzaro reaction catalyst. This catalyst appears to accelerate the second stage which is a Cannizzaro reaction. However, it is not intended to be limited to any theory regarding the way in which the reaction proceeds or the catalyst acts.

Examples of suitable catalysts are cuprous oxide, cuprous hydroxide, hydrous cuprous oxide, cupric oxide, cupric hydroxide, hydrous cupric oxide, silver oxide, silver hydroxide, hydrous silver oxide, or elemental active metals such as activated nickel, Raney nickel, reduced copper, reduced platinum oxide, etc. If desired, the catalyst may be formed in situ by adding to the reaction mixture suitable compounds or solutions of compounds which will form the desired catalyst. Where a compound is precipitated in situ it may comprise a mixture. Thus precipitated cuprous, cupric or silver hydroxide is accompanied by or soon converted to the oxide, especially if the mixture is subjected to an elevated temperature. The so-called "hydrous oxides" may comprise such mixtures of oxide and hydroxide.

In some cases, the elemental active metal catalysts referred to may be formed in situ by suitable means. Moreover, the hydroxides or oxides referred to may be converted partially or completely to the elemental active metal under the conditions of the reaction. However, it is not intended to be limited to any theory in this latter connection.

In addition to markedly improving the yield of pentaerythritol, the catalyst serves another important role in that it yields a condensate which is colorless and odorless, whereas, in corresponding preparations made without a catalyst, the condensate smells of burned sugar, indicating that without a catalyst the excess of formaldehyde is converted at least partially into the mixture of sugars called formose. The catalyst reduces the formation of this formose and in so doing, it increases the pentaerythritol yield and decreases the amount of syrup from which the pentaerythritol must be crystallized. The formation of this syrup in excessive quantities has heretofore caused considerable difficulty in the recovery of pentaerythritol from the reacted mixture.

In accordance with a typical procedure of carrying out the present invention, acetaldehyde and formaldehyde may be admixed, the formaldehyde preferably being in excess, as for example, in the proportions of from about 4 to about 5 mols of formaldehyde per mol of acetaldehyde. Thereupon, alkali such as sodium hydroxide, potassium hydroxide, calcium hydroxide or the like may be added until the pH of the mixture reaches 8.5 (just pink to phenolphthalein). The mixture may be allowed to stand for a prolonged period of time with further addition of alkali, either in periodic intervals or continuously, so as to maintain the pH at about 8.5. Preferably, the mixture is maintained at a temperature of about 30° C. by suitable cooling. When the initial reaction has subsided as indicated by the fact that no more heat is given off, or if desired after the addition of more formaldehyde followed by standing at 30° C. and addition of alkali as necessary to keep the pH at about 8.5 until heat is no longer given off, a suitable amount of catalyst may be added to the mixture whereupon the mixture may be raised to a temperature of 50° C. and maintained at this temperature with stirring for a prolonged period of time. Preferably, alkali is progressively added during the second phase of the reaction at 50° C. so as to maintain the pH not below about 7 and not above about 9.

Following the reaction, the resulting mixture may be filtered to remove the catalyst after which the filtrate may be rendered neutral by acidification with any suitable acid, such as hydrochloric acid, sulfuric acid or the like. If desired, the neutralization with acid may precede filtration to remove the catalyst and any precipitated salt. The neutralized filtrate may be filtered to remove any salt formed by the neutralization after which pentaerythritol crystals may be recovered from the filtrate by crystallization in known manner, as for example, by evaporation of the filtrate under reduced pressure until the pentaerythritol crystals separate.

The catalyst may be added at any time during the reaction. For example, it may be added to the initial reaction mixture whereby as fast as any pentaerythrose is formed, it may be immediately converted to pentaerythritol. Usually, however, it will be preferable to add the catalyst after the initial stage of the reaction has been allowed to proceed to a considerable extent, but before the second stage of the reaction has proceeded to such an extent as to form syrupy reaction products. In this way, the advantages of the catalyst are best realized.

If desired, pentaerythrose may be prepared or purchased separately, and further reacted with more formaldehyde in the presence of a catalyst to yield pentaerythritol. The pentaerythose may or may not be purified prior to such further reaction. If desired, the reaction mixture of formaldehyde and acetaldehyde which results from the initial reaction may be commingled with the catalyst and with additional formaldehyde and alkali after which the mixture may be maintained under conditions which bring about formation of pentaerythritol.

By means of the present invention, a larger excess of formaldehyde may be employed, whereby the reaction is forced to completion without forming syrups in objectionable quantity. In this way, the reaction can be carried out more rapidly or under more drastic conditions without entailing the disadvantageous effect of excessive formation of syrup. Thus, the amount of formaldehyde employed may be as high as 5 or more mols per mol of acetaldehyde. This formaldehyde may be added initially or may be added in stages over the reaction.

In order to illustrate more fully the present invention, the following examples are given.

Example 1

To 326 c. c. of formalin (about 4 mols) was added 44 g. of C. P. acetaldehyde (1 mol) thereupon 10 g. Ca(OH)$_2$ was added and the reaction was allowed to proceed with cooling when the temperature rose above 30° C. When no more heat was given off 25 g. of Raney nickel catalyst and 10 g. Ca(OH)$_2$ were added with shaking to keep the nickel suspended. The mixture was continuously agitated with maintenance at 30° C. until heat was no longer given off. Then another 10 g. portion of Ca(OH)$_2$ was added, the mixture being held at 30° C. until heat was no longer given off. This was repeated with four 10 g. portions and finally one 5 g. portion of Ca(OH)$_2$. Thereupon, agitation was discontinued and the mixture was allowed to stand at room temperature for 8 hours. The resulting mixture was slightly alkaline to phenolphthalein, there was no more formaldehyde odor and the supernatant liquid was colorless. The mixture was heated to 60° C. and filtered to remove the calcium hydroxide and the catalyst. The filtrate was acidified with 20% sulfuric acid until all of the calcium had been precipitated as calcium sulfate. The mixture was again filtered, the precipitate being washed with boiling water and the washing liquid being combined with the filtrate. The filtrate was concentrated in vacuo to incipient crystallization. The resulting hot solution was then treated with calcium carbonate, filtered, the filtrate concentrated to yield the pentaerythritol. The yield was 71 g. (51.1% of theoretical). A comparative run which was identical except that the Raney nickel catalyst was omitted, gave a yield of only 14.7% of theoretical. In this comparative run, the supernatant liquid before the first filtration was amber colored.

Example 2

To 408 c. c. of formalin (about 5 mols) was added 44 g. of C. P. acetaldehyde (1 mol). The remainder of the procedure was the same as in Example 1. The yield was 67 g. (49.3% of theoretical).

Example 3

To a mixture of 44 g. of acetaldehyde (1 mol) and 408 c. c. of formalin (about 5 mols), at 5° C. was added 5 c. c. of 30% NaOH solution. After standing over night, the solution was neutral to phenolphthalein. It was divided into equal halves. To one-half of the resulting solution was added 20 g. of Raney nickel catalyst, thereupon the mixture was allowed to stand with frequent shaking for a prolonged period of time during which 10 c. c. portions of 30% NaOH were added every half hour, until 1½ mols of NaOH had been added in this manner. Thereupon the mixture was heated to 60° C. and then heated to the boiling point for 10 minutes after which it was filtered to remove the catalyst, the filtrate being acidified with 100 c. c. of concentrated hydrochloric acid. The acidified mixture was colorless and odorless. It was treated to recover the pentaerythritol therefrom in accordance with known procedures. There was obtained 19 g. of pure pentaerythritol (28% of theoretical). The syrup which was separated from the crystals was not exhaustively worked up. Had the syrup been exhaustively recovered, the yield of pure pentaerythritol would have been still higher.

The other half of the initial reaction mixture to which no catalyst was added was treated in exactly the same manner except that it was not filtered after the boiling for 10 minutes. It was strongly alkaline. After neutralization with 100 c. c. of concentrated hydrochloric acid, the mixture was brown and smelled of burned sugar. The yield of pure pentaerythritol was only 6%.

*Example 4*

To a mixture of 174 c. c. of formalin (slightly over 2 mols) and 28 c. c. acetaldehyde (22.4 grams or slightly over 0.5 mol) was added 4 g. potassium carbonate dissolved in 10 c. c. of water. This made the solution alkaline to phenolphthalein. The solution was allowed to stand over night. During the night, the temperature of the mixture rose considerably as was evidenced by the fact that the stopper was blown out of the containing flask, and the alkalinity disappeared. To the resulting mixture, there was added 2 g. Cu(NO$_3$)$_2$ and 10 c. c. of a 11.4% solution of NaOH. The mixture was allowed to stand, 10 c. c. portions of 11.4% NaOH being added at intervals of one-half hour with shaking until 175 c. c. (20 g. NaOH) had been added. Thereupon the mixture was heated to 50° C. and allowed to stand at this temperature for one hour. It was filtered to remove copper hydroxide, the filtrate acidified and concentrated in vacuo and pentaerythritol recovered therefrom.

*Example 5*

To a mixture of 174 c. c. of formalin (slightly over 2 mols) and 28 c. c. of acetaldehyde (22.4 g. or slightly over 0.5 mol) there was added at 25° C. a suitable amount of phenolphthalein. To the mixture was added 10 c. c. (1.14 g. NaOH) 11.4% NaOH solution. The temperature rose gradually to 36° C. whereupon the mixture was cooled until the temperature was 25° C. Upon discontinuance of cooling, the temperature rose to 30° C. at which point it was held until the pink color had almost disappeared which required one hour. Thereupon 10 c. c. of 11.4% sodium hydroxide were added to the mixture. 10 minutes later, 10 g. of Raney nickel catalyst which was slightly wet with methyl alcohol was added to the mixture with stirring. After 5 minutes, 30 c. c. of 11.4% sodium hydroxide was added in 10 c. c. increments at 20 minute intervals. The mixture was allowed to stand over night. Sodium hydroxide (11.4%) solution was added in 10 c. c. increments at 10 minute intervals until 175 c. c. (20 g. NaOH) had been added. Agitation was continued for one hour at which point a foam formed. The mixture was then heated to 50° C. and allowed to stand at this temperature for one-half hour whereupon it was filtered, acidified with 45 c. c. of concentrated hydrochloric acid, and the almost water white solution evaporated under reduced pressure and filtered at 100° C. to remove pentaerythritol from salt. The filtrate was treated in the usual manner to recover crystalline pentaerythritol. The yield was about 25% of pure pentaerythritol.

In Example 5, the purpose of the progressive addition of alkali was to maintain the pH as nearly as possible at not below about 8.5 and at not above about 9. Likewise, in the other examples the alkali was added progressively with a view to maintaining the pH throughout at not less than about 7 and not more than 9. This maintenance of pH between predetermined limits is particularly important following the addition of the catalyst to the mixture and results in a materially improved process.

It will be understood that the details and examples hereinbefore set forth are illustrative only and that the invention as broadly described and claimed is in no way limited thereby.

What I claim and desire to protect by Letters Patent is:

1. The process of preparing pentaerythritol which comprises condensing formaldehyde and acetaldehyde in the presence of an inorganic Cannizzaro reaction catalyst selected from the group consisting of cuprous oxide, cuprous hydroxide, cupric oxide, cupric hydroxide, silver oxide, silver hydroxide, and elemental active nickel, copper and platinum and in the presence of an alkali.

2. The process of preparing pentaerythritol which comprises condensing formaldehyde and acetaldehyde, adding an inorganic Cannizzaro reaction catalyst selected from the group consisting of cuprous oxide, cuprous hydroxide, cupric oxide, cupric hydroxide, silver oxide, silver hydroxide and elemental active nickel, copper and platinum to the partially reacted mixture and subsequently further reacting the mixture in the presence of said catalyst.

3. The process which comprises mixing formaldehyde with acetaldehyde in such proportions that from about 4 to about 5 mols of formaldehyde is present in the mixture per mol of acetaldehyde, reacting the mixture in the presence of an alkali for a prolonged period of time while maintaining the reaction mixture at a temperature of from about 20° C. to about 35° C., adding an inorganic Cannizzaro reaction catalyst selected from the group consisting of cuprous oxide, cuprous hydroxide, cupric oxide, cupric hydroxide, silver oxide, silver hydroxide and elemental active nickel, copper and platinum to the resulting mixture, thereafter reacting the mixture at a temperature of from about 40° C. to about 60° C., and thereafter recovering pentaerythritol from the mixture.

4. The process of preparing pentaerythritol which comprises condensing formaldehyde and acetaldehyde in the presence of an elemental active nickel catalyst and in the presence of an alkali.

5. The process of preparing pentaerythritol which comprises condensing formaldehyde and acetaldehyde in the presence of Raney nickel catalyst and in the presence of an alkali.

6. The process of preparing pentaerythritol which comprises mixing acetaldehyde with an excess of formaldehyde, reacting the mixture in the presence of a small amount of alkali, progressively adding alkali to the mixture to maintain the pH thereof between about 7 and about 9, adding an elemental active nickel catalyst to the reaction mixture, continuing said progressive addition of alkali while further reacting the mixture, acidifying the resulting mixture, and recovering pentaerythritol from the acidified mixture.

7. The process of preparing pentaerythritol which comprises reacting a material selected from the group consisting of acetaldehyde and the reaction product of formaldehyde with acetaldehyde, with formaldehyde in the presence of an inorganic Cannizzaro reaction catalyst selected from the group consisting of cuprous oxide, cuprous hydroxide, cupric oxide, cupric hydroxide, silver oxide, silver hydroxide and elemental active nickel, copper, and platinum and in the presence of an alkali.

8. The process of preparing pentaerythritol which comprises reacting pentaerythrose with formaldehyde in the presence of an alkali and an inorganic Cannizzaro reaction catalyst selected from the group consisting of cuprous oxide, cuprous hydroxide, cupric oxide, cupric hydroxide, silver oxide, silver hydroxide and elemental active nickel, copper, and platinum.

9. The process of preparing pentaerythritol which comprises treating with an inorganic Cannizzaro reaction catalyst selected from the group consisting of cuprous oxide, cuprous hydroxide, cupric oxide, cupric hydroxide, silver oxide, silver hydroxide and elemental active nickel, copper, and platinum in the presence of an alkali, a mixture selected from the group consisting of a mixture of formaldehyde and acetaldehyde, a mixture of formaldehyde, acetaldehyde, and pentaerythrose, and a mixture of formaldehyde and pentaerythrose.

10. In the preparation of pentaerythritol by the condensation of formaldehyde with acetaldehyde in the presence of an alkali, the step which comprises introducing an inorganic Cannizzaro reaction catalyst selected from the group consisting of cuprous oxide, cuprous hydroxide, cupric oxide, cupric hydroxide, silver oxide, silver hydroxide and elemental active nickel, copper and platinum during a portion of the preparation.

11. The process of preparing pentaerythritol which comprises reacting the reaction product of formaldehyde and acetaldehyde with formaldehyde in the presence of an inorganic Cannizzaro reaction catalyst selected from the group consisting of cuprous oxide, cuprous hydroxide, cupric oxide, cupric hydroxide, silver oxide, silver hydroxide and elemental active nickel, copper, and platinum and in the presence of an alkali.

12. The process of preparing pentaerythritol which comprises reacting the reaction product formed by reacting formaldehyde with acetaldehyde in the presence of alkali, with formaldehyde in the presence of alkali and an inorganic Cannizzaro reaction catalyst selected from the group consisting of cuprous oxide, cuprous hydroxide, cupric oxide, cupric hydroxide, silver oxide, silver hydroxide and elemental active nickel, copper and platinum.

13. The process of preparing pentaerythritol which comprises effecting aldol condensation of formaldehyde with acetaldehyde in the presence of an alkali, and then effecting reduction of the resulting aldol condensation product and simultaneous oxidation of formaldehyde in the presence of an alkali and an inorganic Cannizzaro reaction catalyst selected from the group consisting of cuprous oxide, cuprous hydroxide, cupric oxide, cupric hydroxide, silver oxide, silver hydroxide and elemental active nickel, copper and platinum.

14. The process of preparing pentaerythritol which comprises condensing formaldehyde and acetaldehyde in the presence of cupric hydroxide.

RICHARD F. B. COX.